US008684824B2

(12) United States Patent
Champagne et al.

(10) Patent No.: US 8,684,824 B2
(45) Date of Patent: Apr. 1, 2014

(54) SIDE BETTING ON GAMING AND RELATED NON GAMING ITEMS

(75) Inventors: Christiaan Ronald Champagne, Renton, WA (US); Hans Elias, Reno, NV (US); Chad Little, Las Vegas, NV (US); Reid Weber, Reno, NV (US)

(73) Assignee: IGT, Las Vegas, NV (US)

(*) Notice: Subject to any disclaimer, the term of this patent is extended or adjusted under 35 U.S.C. 154(b) by 503 days.

(21) Appl. No.: 12/824,829

(22) Filed: Jun. 28, 2010

(65) Prior Publication Data

US 2011/0319158 A1 Dec. 29, 2011

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .......... 463/25; 463/29

(58) Field of Classification Search
USPC .......... 463/25
See application file for complete search history.

(56) References Cited

U.S. PATENT DOCUMENTS

| | | | | |
|---|---|---|---|---|
| 5,511,781 | A | 4/1996 | Wood et al. | |
| 5,816,918 | A | 10/1998 | Kelly et al. | |
| 6,186,893 | B1 | 2/2001 | Walker et al. | |
| 6,390,917 | B1 | 5/2002 | Walker et al. | |
| 6,848,995 | B1 | 2/2005 | Walker et al. | |
| 6,890,256 | B2 | 5/2005 | Walker et al. | |
| 7,063,618 | B2 | 6/2006 | Walker et al. | |
| 7,094,149 | B2 | 8/2006 | Walker et al. | |
| 7,326,115 | B2 | 2/2008 | Baerlocher | |
| 7,473,177 | B2 | 1/2009 | Walker et al. | |
| 7,658,674 | B2 | 2/2010 | Walker et al. | |
| 7,666,094 | B2 | 2/2010 | Baerlocher et al. | |
| 7,674,178 | B2 | 3/2010 | Baerlocher et al. | |
| 7,674,179 | B2 | 3/2010 | Baerlocher et al. | |
| 7,677,971 | B2 | 3/2010 | Baerlocher et al. | |
| 7,677,972 | B2 | 3/2010 | Baerlocher et al. | |
| 7,682,248 | B2 | 3/2010 | Baerlocher et al. | |
| 7,753,789 | B2 | 7/2010 | Walker et al. | |
| 7,780,525 | B2 | 8/2010 | Walker et al. | |
| 7,878,893 | B1 * | 2/2011 | Mayeroff | 463/16 |
| 7,878,901 | B2 | 2/2011 | Walker et al. | |
| 8,408,994 | B2 | 4/2013 | Baerlocher et al. | |
| 2003/0216169 | A1 | 11/2003 | Walker et al. | |
| 2004/0106454 | A1 | 6/2004 | Walker et al. | |
| 2005/0143166 | A1 * | 6/2005 | Walker et al. | 463/25 |
| 2006/0040735 | A1 | 2/2006 | Baerlocher | |
| 2006/0121983 | A1 | 6/2006 | Walker et al. | |
| 2006/0252527 | A1 | 11/2006 | Walker et al. | |
| 2007/0026924 | A1 | 2/2007 | Taylor | |
| 2008/0039189 | A1 | 2/2008 | Walker et al. | |

(Continued)

*Primary Examiner* — Milap Shah
*Assistant Examiner* — Syvila Weatherford
(74) *Attorney, Agent, or Firm* — Neal, Gerber & Eisenberg LLP

(57) ABSTRACT

A gaming device including an interface unit configured to accept game play data from a player, and a controller coupled to the interface unit. The controller includes a processor and a memory, wherein the memory stores player tracking data and wherein the processor is configured to receive, via the interface unit, game play data for the player playing a primary game, initiate a play of a secondary game if a triggering event occurs, enable a player to select at least one of a plurality of different loyalty awards associated with the secondary game, determine an outcome of the secondary game, and issue a loyalty award based on the determined outcome of the secondary game.

20 Claims, 4 Drawing Sheets

(56) References Cited

U.S. PATENT DOCUMENTS

| | | | | |
|---|---|---|---|---|
| 2008/0085771 | A1* | 4/2008 | Iddings et al. | 463/42 |
| 2008/0085772 | A1 | 4/2008 | Iddings et al. | |
| 2009/0011836 | A1 | 1/2009 | Friesen et al. | |
| 2009/0088239 | A1 | 4/2009 | Iddings et al. | |
| 2010/0174600 | A1 | 7/2010 | Walker et al. | |
| 2010/0227664 | A1 | 9/2010 | Walker et al. | |
| 2010/0227684 | A1 | 9/2010 | Walker et al. | |
| 2010/0227693 | A1 | 9/2010 | Umaki et al. | |
| 2010/0228606 | A1 | 9/2010 | Walker et al. | |
| 2010/0267444 | A1 | 10/2010 | Walker et al. | |
| 2011/0130188 | A1 | 6/2011 | Walker et al. | |

* cited by examiner

SIDE BETTING ON GAMING AND RELATED NON GAMING ITEMS

BACKGROUND

Customer loyalty programs are well known in the gaming industry. For example, at least some known gaming establishments have customized versions of loyalty programs that use a player tracking card that uniquely identifies each player. Player tracking on gaming devices such as slot machines is typically accomplished using a card reader mounted to the gaming device. When the player sits down at a gaming device, he inserts his player tracking card into a card reader that reads a player identification number off the player tracking card and communicates information through a network to a central computer regarding the player's gaming activity. Based on the data received, the gaming establishment can classify each player and selectively provide such players certain benefits based on the classifications. As such, at least some known player tracking systems enable gaming establishments to recognize and reward customer loyalty. A cumulative history of a particular player's gaming activity, included in the player's profile, enables gaming establishments to selectively target players with direct marketing promotions or customized compensation plans.

Moreover, at least some known customer loyalty programs and incentives are funded by a gaming establishment's marketing department. However, typically marketing department promotions are not accounted for in determining the overall paytable for the gaming machines. As such, there is a continuing need to provide gaming establishments with additional or alternative options for use as loyalty incentives. Ideally, such loyalty incentives should target frequent or loyal players, should be adjustable in amount and triggering frequency in proportion to a level of the player's loyalty (e.g., frequent or loyal players deserve more frequent or larger awards), and should be viewed as a loyalty offering provided by the gaming establishment. Additionally, if possible, such loyalty offerings should have the appearance of being more valuable or enticing than typical promotional credits, while still providing a mechanism for the gaming establishment to facilitate controlling costs associated with awarding such loyalty bonuses.

BRIEF DESCRIPTION OF THE INVENTION

The present disclosure expands on a desire of gaming establishments to reward loyal customers. The present disclosure describes utilizing a player's transaction history within a gaming establishment to determine loyalty awards available in a side bet/secondary game.

In one embodiment, a gaming device is provided that includes an interface unit configured to accept game play data from a player, and a controller coupled to the interface unit. The controller includes a processor and a memory, wherein the memory stores player tracking data. The processor is configured to receive, via the interface unit, game play data for the player playing a primary game, initiate a play of a secondary game if a triggering event occurs, enable a player to select at least one of a plurality of different loyalty awards associated with the secondary game, determine an outcome of the secondary game, and issue a loyalty award based on the determined outcome of the secondary game.

In another embodiment, a system is provided that includes at least one server including memory configured to store player tracking data, wherein the player tracking data comprises a transaction history of a player, and a plurality of gaming machines communicatively coupled to the at least one server via a gaming network. Each of the plurality of gaming machines include a processor programmed to receive game play data for the player playing a primary game, initiate a play of a secondary game if a triggering event occurs during play of the primary game, and provide the server with an indication that the secondary game is initiated. The server determines at least one of a plurality of different loyalty awards associated with the secondary game based on the transaction history of the player, determines the odds of issuing the loyalty award based on at least one of a value of a selected loyalty award and a wager amount associated with the secondary game, and updates the transaction history of the player based on an outcome of the secondary game.

In still another embodiment, a method is provided that includes receiving, via an interface unit, game play data for a player playing a primary game, initiating a secondary game if a triggering event occurs during play of the primary game, determining at least one of a plurality of loyalty awards associated with the secondary game based on a transaction history of the player, determining an outcome of the secondary game, and issuing a loyalty award based on the determined outcome of the secondary game.

BRIEF DESCRIPTION OF THE DRAWINGS

The present disclosure is described in detail below with reference to the attached drawing Figures.

DETAILED DESCRIPTION OF THE INVENTION

The present disclosure expands on a desire of gaming establishments to cater to loyal customers. In some embodiments, the present disclosure describes gaming devices, systems, and methods for utilizing a player's transaction history associated with a gaming establishment to determine loyalty awards in a secondary game. The secondary game may incorporate any of the types of games described herein, as well as any suitable wheel game, any suitable selection game, any suitable offer and acceptance game, any suitable cascading symbols game, any suitable ways to win game, any suitable scatter pay game or any other suitable type of game.

In some embodiments, a server-based network interfaces with other property systems to incorporate a player's transactional history into a player tracking system. A player's transactional history may include information regarding what items or services a player has purchased within or related to a gaming establishment, such as hotel rooms, drinks, clothes, massages, haircuts, dinners, souvenirs, shows, movies, and the like. Each item included in a transactional history of a player may be considered a loyalty award that may be won in a side bet/secondary game (hereinafter referred to as a secondary game). For example, a player may play a primary game that, upon initiation of a triggering event, initiates a secondary game that provides the player an opportunity to win a loyalty award, such as, an item or service from the player's transactional history. Providing a player an opportunity to win loyalty awards (e.g., items in a player's transaction history) in a secondary game, enables the player to try, for example, to have a bill paid off, and thus enhance the excitement for the player.

The present disclosure may be implemented in various configurations for gaming machines or gaming devices, including but not limited to: (1) a dedicated gaming machine or gaming device, wherein the computerized instructions for controlling the games, provided by the gaming machine or gaming device, are stored within the gaming machine or gaming device prior to delivery to a gaming establishment; and/or (2) a changeable gaming machine or gaming device, wherein the computerized instructions for controlling the games are subsequently downloaded to the gaming machine or gaming device through a data network after the gaming machine or gaming device is in a gaming establishment.

Figure 3:
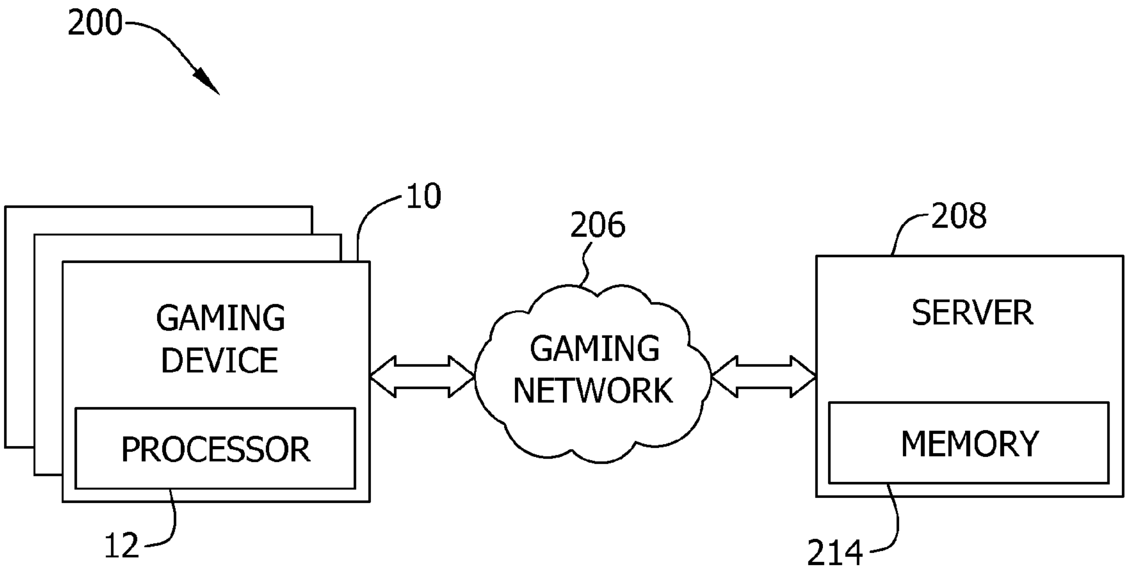
FIG. 3 is a block diagram of an exemplary gaming network that may be used with a plurality of gaming devices, such as those shown in FIG. 1.
Figure 4:
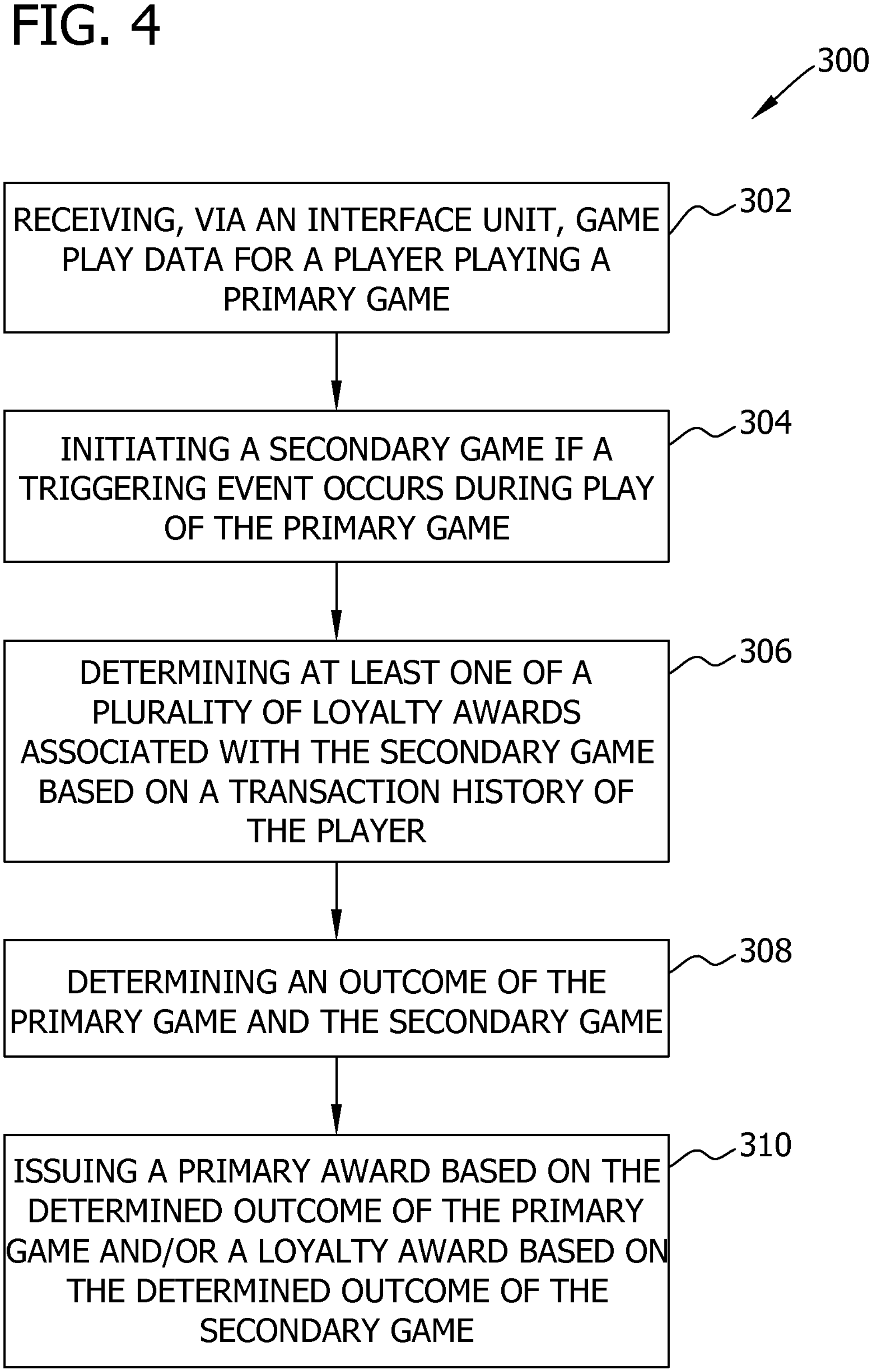
FIG. 4 is a flow diagram of an exemplary method for determining awards in a secondary game.

As illustrated in FIG. 3, in some embodiments, the computerized instructions for controlling any games are executed by a server 208, for example, a central controller or remote host. In such an embodiment known as a "thin client," server 208 remotely controls the games, or other suitable interfaces, via a gaming network 206, and a gaming device 10 is used to display the games, or suitable interfaces, and to receive inputs or commands from a player.

In another embodiment, the computerized instructions for controlling any games are communicated from server 208 to a local processor and memory coupled within gaming device 10. In such any embodiment, in a "thick client" the gaming device 10 local processor executes the communicated computerized instructions to control any games or other suitable interfaces provided to a player.

One or more of the gaming devices 10 in gaming system 200 may be thin client gaming devices and one or more of the gaming devices 10 in gaming system 200 may be thick client gaming devices. In another embodiment, certain functions of gaming device 10 are implemented in a thin client environment and certain other functions of gaming device 10 are implemented in a thick client environment. In one such embodiment, computerized instructions for controlling the games are communicated from server 208 to each gaming device 10 in a thick client configuration and computerized instructions for controlling any secondary games or bonus functions are executed by server 208 in a thin client configuration.

Figure 1:
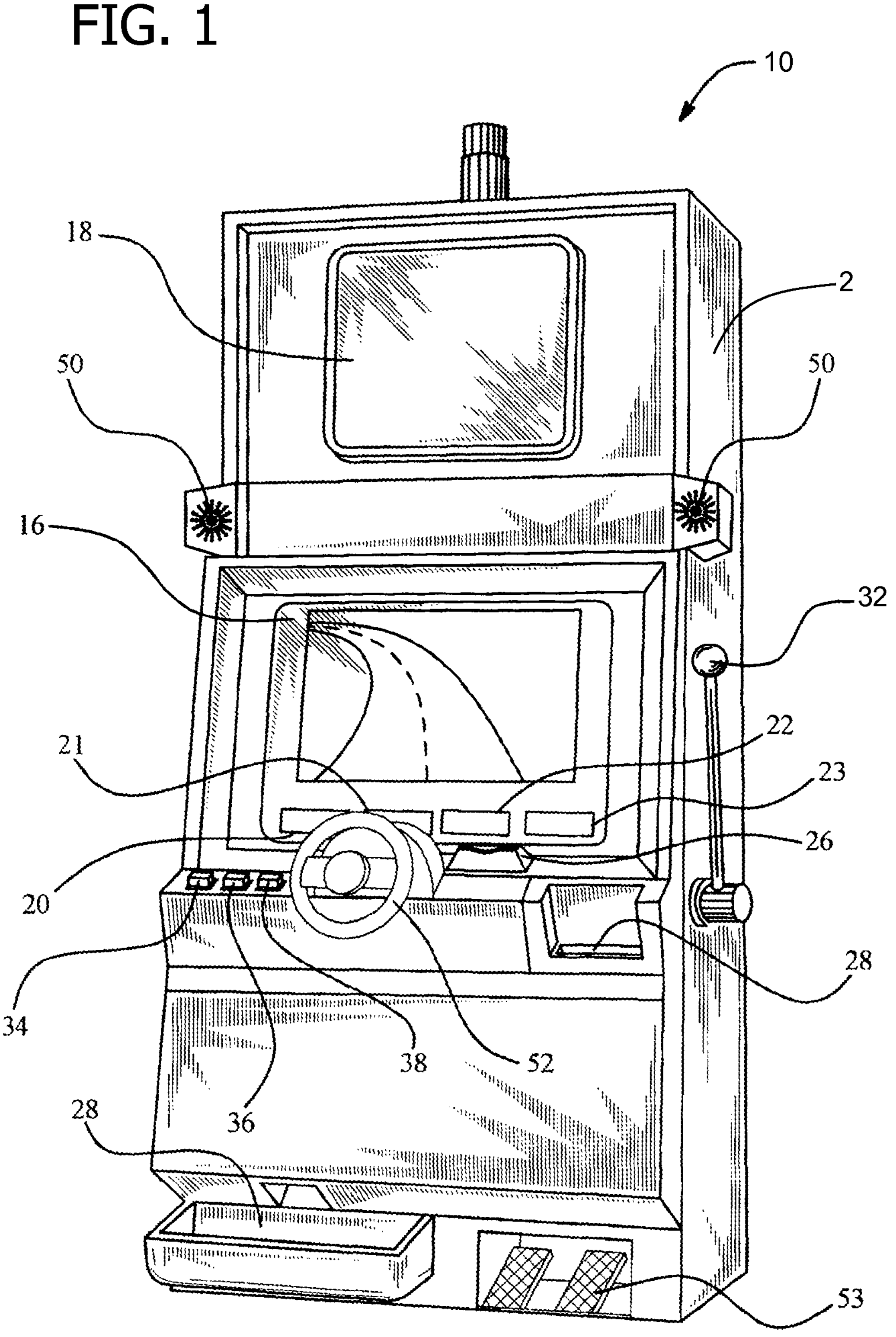
FIG. 1 is perspective illustration of an exemplary gaming device.

In the exemplary embodiment, and as shown in FIG. 1, gaming device 10 includes a support structure, housing, or cabinet 2 that provides support for a plurality of interface units, displays, inputs, controls and other features of a conventional gaming machine. Device 10 is configured so that a player can operate it while standing or sitting. Moreover, device 10 may be positioned on a base or stand, or can be configured as a pub-style table-top game (not shown) that a player can operate while seated. Gaming device 10 is not limited to only being the device illustrated in FIG. 1, but as will be appreciated by one of ordinary skill in the art, device 10 may have varying cabinets 2 and display configurations, without departing from the scope of the present invention.

Figure 2:
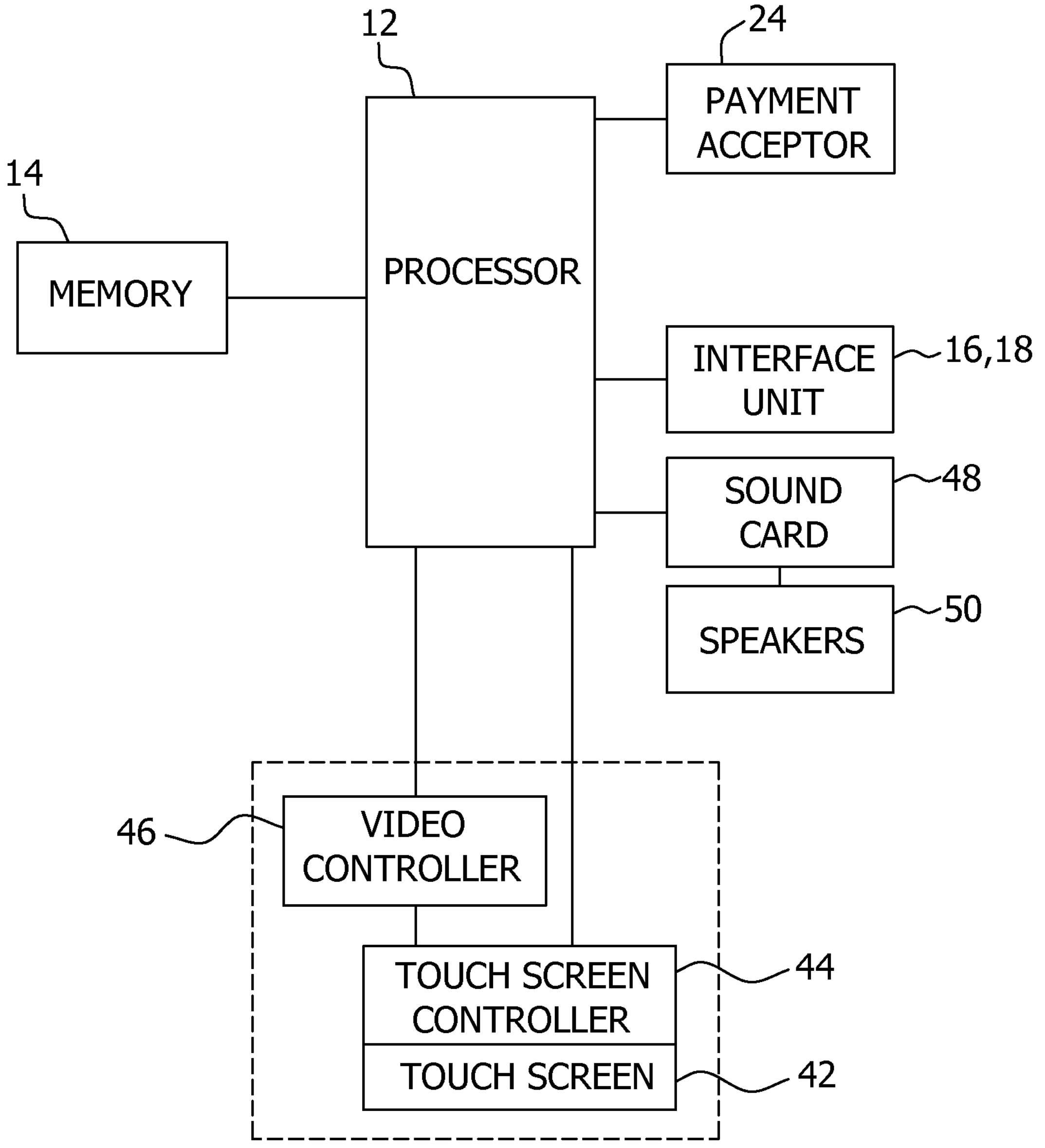
FIG. 2 is a block diagram of an exemplary electronic configuration of a gaming device, such as the gaming device shown in FIG. 1.

In the exemplary embodiment, and as shown in FIG. 2, gaming device 10 includes at least one processor 12 or other suitable controller, such as a microprocessor, a microcontroller-based platform, a suitable integrated circuit or one or more application-specific integrated circuits (ASIC's). Processor 12 is coupled in communication with, or is operable to access or to exchange signals with at least one data storage module or memory 14. In one embodiment, processor 12 and memory 14 reside within gaming device cabinet 2. Memory 14 stores program code and instructions, executable by processor 12, to control gaming device 10. Memory 14 also stores other data such as image data, event data, player input data, random or pseudo-random number generators, look-up table data, payback data or information and applicable game rules that relate to the play of the gaming device 10. In one embodiment, memory 14 includes random access memory (RAM), that can include non-volatile RAM (NVRAM), magnetic RAM (MRAM), ferroelectric RAM (FeRAM) and other forms as commonly understood in the gaming industry. In another embodiment, memory 14 includes read only memory (ROM). In yet another embodiment, memory 14 includes flash memory and/or EEPROM (electrically erasable programmable read only memory). Any other suitable magnetic, optical and/or semiconductor memory may be used to operate in conjunction with gaming device 10 that enables device 10 to function as described herein. In embodiments, processor 12 executes computer-executable instructions to utilize a player's transaction history to determine awards in a secondary game.

In embodiments, part or all of the program code and/or operating data described above is stored in a detachable or removable memory, including, but not limited to, a suitable cartridge, disk, CD ROM, DVD or USB memory device. Moreover, in other embodiments, part or all of the program code and/or operating data described above is downloadable to memory 14 through a suitable network.

An operator or a player can use such a removable memory in a desktop computer, a laptop personal computer, a personal digital assistant (PDA), portable computing device, or other computerized platform to implement the present disclosure. In one embodiment, the gaming device 10 or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that each gaming device 10 or gaming machine disclosed herein may be a device that has obtained approval from a regulatory gaming commission or a device that has not obtained approval from a regulatory gaming commission. It should also be appreciated that processor 12 and memory 14 may be collectively referred to herein as a "computer" or "controller."

In the exemplary embodiment, and as shown in FIGS. 1 and 2, gaming device 10 includes one or more interface units 16 and 18 that are controlled by processor 12. Units 16 and 18 are preferably coupled to cabinet 2 to display a game and to accept game play data from a player. Moreover, interface unit 16 may also display information relating to an interactive game, wager triggering event, or wagering outcome. Alternatively, gaming device 10 may include only display 16 or 18. In the exemplary embodiment, upper interface unit 18 may display any wagering outcome, any suitable secondary game associated or not associated with the interactive game, and/or any information relating to the interactive games. Display 18 is also configured to accept game play data from a player. These interface units 16 and 18 may also serve as digital glass operable to advertise games or other aspects of the gaming establishment. In the exemplary embodiment, gaming device 10 also includes a credit or fund display 20 which displays a player's current number of credits, cash accumulated, account balance, or an original number of credits the player funded the gaming machine with, or an equivalent of any of the aforementioned. Moreover, in the exemplary embodiment, gaming device 10 includes a wager component display 21 that displays an amount being wagered and also includes an amount of credits won display 22 that displays a player's accumulated winnings. Furthermore, in the exemplary embodiment, gaming device 10 includes an interactive game display, such as a points display 23 that displays a player's points for an interactive game.

In another embodiment, at least one interface unit may be a mobile display device, such as a PDA or tablet PC that enables play of at least a portion of the games at a location remote from gaming device 10.

Interface units 16 and/or 18 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, at least one interface unit 16 and/or 18 includes a touch-screen, for example touch-screen 42, that is used with an associated touch-screen controller, for example touch-screen controller 44. Moreover, interface units 16 and/or 18 may be of any suitable size and configuration, such as a circular, square, or rectangular.

Interface units 16 and 18 display at least one, and preferably a plurality of, games or other suitable images, symbols and indicia such as any visual representation or exhibition of a movement of objects such as mechanical, virtual or video reels and wheels, dynamic lighting, video images, images of people, characters, places, things and faces of cards, and the like. In one embodiment, the symbols, images and indicia displayed on or of the interface unit are in a mechanical form. That is, interface unit 16 and/or 18 may include any electro-mechanical device, such as one or more mechanical objects, such as one or more rotatable wheels, reels or dice, configured to display at least one or a plurality of games or other suitable images, symbols or indicia.

In the exemplary embodiment, gaming device 10 includes at least one payment acceptor 24 coupled in communication with processor 12. Payment acceptor 24 may include a coin slot 26 and a payment, note, or bill acceptor 28, wherein a player may insert money, coins, or tokens. In other embodiments, devices such as readers or validators for credit cards, debit cards, or credit slips may accept payment. In one embodiment, a player may insert an identification card (not shown) into a card reader of gaming device 10. The identification card may be a smart card that includes a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to gaming device 10. In one embodiment, money may be transferred to gaming device 10 via an electronic funds transfer. When a player funds gaming device 10, processor 12 determines an amount of funds entered and displays the corresponding amount on the credit or other suitable display as described above.

Gaming device 10 includes at least one input device that is coupled in communication with processor 12. Input devices can include any suitable device that enables the player to produce an input signal that is receivable by processor 12. For example, in one embodiment, after funding gaming device 10, the input device is a game activation device, such as a pull arm 32 or a play button 34 that enables the player to start the game or a sequence of events in gaming device 10. Play button 34 can be any suitable play activator such as a bet one button, a max bet button, or a repeat the bet button. In one embodiment, after appropriate funding of gaming device 10, the game play begins automatically. In another embodiment, after a player engages one of the play buttons, such as button 36, gaming device 10 automatically activates game play.

In the exemplary embodiment, one input device is a "Bet One" button 36. The player places a bet by pushing Bet One button 36 and can increase the bet by pushing Bet One button 36. When the player pushes Bet One button 36, the number of credits shown in the credit display decreases by one, and the number of credits shown in the bet display increases by one. In another embodiment, one input device is a "Bet Max" button (not shown) that enables the player to bet the maximum wager component permitted for a game of gaming device 10.

In the exemplary embodiment, one input device is "Cash Out" button 38. The player may push Cash Out button 38 to receive a cash payment or other suitable form of payment corresponding to the number of credits remaining In one embodiment, when the player cashes out, the player receives coins or tokens in a coin payout tray 28. In another embodiment, when the player cashes out, the player receives other payout mechanisms, such as tickets or credit slips, that are redeemable by a cashier (or other suitable redemption system), or funding to the player's electronically recordable identification card.

As best seen in FIG. 2, one input device is a touch-screen 42 (e.g., display 16) that is coupled to a touch-screen controller 44, or some other touch-sensitive display overlay to enable player interaction with images on display 16 and/or 18. Touch-screen 42 and the touch-screen controller 44 are connected to a video controller 46. A player can input signals into gaming device 10 by touching touch-screen 42.

Gaming device 10 may also include a plurality of communication ports for enabling communication of processor 12 with external peripherals, such as external video sources, expansion buses, game or other displays, an SCSI port or a key pad. In the exemplary embodiment, gaming device 10 includes a sound generating device (not shown) controlled by one or more sounds cards 48 that are controlled by processor 12. In one embodiment, the sound generating device includes at least one speaker 50 or other sound generating hardware and/or software for use in generating sounds, such as playing music for the game or for other operating modes of gaming device 10. In one embodiment, gaming device 10 provides dynamic sounds, coupled with attractive multimedia images displayed on one or more of the interface units 16 and 18, to provide an audio-visual representation or to otherwise display full-motion video with sound to attract potential players gaming device 10. During idle periods, gaming device 10 may display a sequence of audio and/or visual attraction messages to attract potential players to gaming device 10. The videos may also be customized to provide any appropriate information.

In one embodiment, gaming device 10 may include a sensor, such as a camera (not shown) coupled in communication with processor 12, and possibly controlled by processor 12 to be selectively positionable to acquire an image of a player actively playing gaming device 10, and/or a surrounding area of gaming device 10. In one embodiment, the camera may selectively acquire still or moving (e.g., video) images and may be configured to acquire the images in either an analog, digital, or other suitable format. Interface units 16 and 18 may be configured to display the image acquired by the camera, as well as to display the visible manifestation of the game in split screen or picture-in-picture fashion. For example, the camera may acquire an image of the player and processor 12 may incorporate that image into the interactive and/or secondary game as a game image, symbol or indicia.

One or more of gaming device 10 may be in communication with server 208 (shown in FIG. 3) for monitoring purposes only. That is, each individual gaming device 10 randomly generates game outcomes that are provided to the player and server 208 monitors the activities and events occurring on the plurality of gaming devices 10. In the exemplary embodiment, gaming network 206 (shown in FIG. 3) includes a real-time or on-line accounting and gaming information system that is operably coupled to server 208. The accounting and gaming information system of this embodiment includes a player database for storing player profiles, a player tracking module for tracking players and a credit system for providing automated casino transactions.

In one embodiment, gaming device 10 is associated with, or otherwise integrated into, one or more player tracking systems that include player transaction history. More specifically, gaming device 10 and/or the player tracking system tracks any players gaming activity at gaming device 10. In one embodiment, gaming device 10 and/or the associated player tracking system tracks when a player inserts his playing tracking card to begin a gaming session and also timely tracks when a player removes his player tracking card when concluding play for that gaming session. In another embodiment, rather than requiring a player to insert a player tracking card, gaming device 10 utilizes one or more portable devices carried by a player, such as a cell phone, a radio frequency identification tag or any other suitable wireless device to track when a player begins and ends a gaming session. In a further embodiment, gaming device 10 utilizes any suitable biometric technology or ticket technology to track when a player begins and ends a gaming session.

During gaming sessions, gaming device 10 and/or player tracking system tracks any suitable information, such as any amounts wagered, the interactive game outcomes, wagering outcomes, average wager components and/or the time these wagers are placed, as well as a transaction history, such as purchases made within or associated with a gaming establishment, for example, hotel rooms, drinks, clothes, massages, haircuts, dinners, souvenirs, shows, movies, and the like. In some embodiments, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. Moreover, in some embodiments, the player tracking system tracks the above-referenced information and enables gaming device 10 to display this information to a player. For example, during game play, gaming device 10 displays, either persistently or based on a player command, a current number of points earned by the player, an in-game currency value that represents a number of credits purchased by the player through cash or some other medium, a side game currency value that represents wager amounts made on other games or a number of credits available for such wagers, and/or a digital score for use in obtaining virtual and/or physical awards for use during game play. Furthermore, in some embodiments, gaming device 10 displays, either persistently or based on a player command, a leader board that shows where the player ranks with other players in terms of points earned or a digital score.

In the exemplary embodiment, a plurality of gaming devices 10 are connected together through a data network. In one embodiment, the data network is a local area network (LAN), in which one or more of gaming devices 10 are substantially proximate to each other and an on-site central server or controller as in, for example, a gaming establishment or a portion of a gaming establishment. In another embodiment, the data network is a wide area network (WAN) in which one or more of gaming devices 10 are in communication with at least one off-site central server or controller. In this embodiment, the plurality of gaming devices 10 may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

The data network may be the Internet or an intranet. In this embodiment, the operation of gaming device 10 can be viewed at gaming device 10 with at least one internet browser. In this embodiment, operation of gaming device 10 and accumulation of credits may be accomplished with only a connection to server 208 (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In the exemplary embodiment, one or more of gaming device 10 are in communication with each other and/or server 208 through gaming network 206. In this embodiment, server 208 is any suitable server or computing device that includes a processor, a memory 214 (shown in FIG. 3), and/or a storage device (not shown). Server 208 is a progressive controller or a processor of one of gaming devices 10 in gaming system 200. In these embodiments, processor 12 is designed to transmit and receive events, messages, commands or any other suitable data or signal between gaming device 10 and server 208. A gaming device processor, for example, processor 12, is operable to execute such communicated events, messages or commands in conjunction with the operation of gaming device 10. Moreover, the server processor (not shown) is designed to transmit and receive events, messages, commands or any other suitable data or signal between server 208 and each individual gaming devices 10. The server processor is operable to execute such communicated events, messages or commands in conjunction with the operation of server 208.

Processor 12 is programmed to receive, via interface unit 16, game play data for a player playing a primary game on gaming device 10. During play of the primary game, a triggering event may occur. Such an event may be one or more of the following: a point accumulation, a length of time, and a level in the primary game. After an indication that a triggering event has occurred in the primary game, processor 12 is programmed to initiate a play of a secondary game (e.g., a side bet).

The secondary game may incorporate any of the types of games described herein, as well as any suitable wheel game, any suitable selection game, any suitable offer and acceptance game, any suitable cascading symbols game, any suitable ways to win game, any suitable scatter pay game or any other suitable type of game. In one embodiment, gaming system 200 incorporates different games to incorporate into the secondary game based on different values determined to be provided as the loyalty award. For example, in one embodiment, if the determined value is within a first range of values, gaming system 200 utilizes a first type of game in the secondary game and if the determined value is within a second range of values, gaming system 200 utilizes a second type of game in the secondary game. In different embodiments, the type of game utilized in the secondary game is predetermined or randomly determined However, in any of the above examples, the secondary game provides the player with an opportunity to win a loyalty award, for example, a removal of an item or service from the player's transactional history.

In some embodiments, server 208 interfaces with other property systems and accumulates a list of the player's transaction history regarding each transaction the player makes. The player's transactional history may include information regarding what items or services a player has purchased within or related to a gaming establishment, such as hotel rooms, drinks, clothes, massages, haircuts, dinners, souvenirs, shows, movies, and the like. In other embodiments, each of the items listed in the transaction history may be itemized even further. For example, a purchase of a dinner may be separated into drinks, entrees, desert, and the like. Therefore, a dinner a player had previously purchased may be considered a loyalty award, or individual items purchased at dinner may be considered a loyalty award. In one embodiment, server 208 determines a triggering event to determine when to provide a chance to win a loyalty award and which player to provide such a chance to win a loyalty award based on applicable player tracking information. In such an embodiment, server 208 may utilize information or data maintained by the player tracking system to ascertain transaction history, betting history and wagers about each player. The player tracking system, or alternatively a player tracking module associated with server 208 communicates such information or data to server 208 and server 208 determines which player(s), if any, to provide a chance to win a loyalty award to based on such information.

In the exemplary embodiment, server 208 enables a player to play a primary game and recognizes when a triggering event occurs, for example, when the player meets a designated threshold to be eligible for a loyalty award. After the player has satisfied the designated threshold, such as the player accumulating a designated number of player tracking points, a length of time, and a level in the primary game, server 208 provides the player with an opportunity to win a loyalty award via a secondary game. It should be appreciated that in this embodiment, since a player's tracking points or status may be associated with the player's wager and/or amount of time spent at a gaming establishment, players who consistently bet higher amounts and/or spend substantial amounts of time and/or money at a gaming establishment, may be more likely to be eligible to win or receive a loyalty award than a player who has little or no recorded history with the gaming establishment (e.g., a player with little or no tracked information). In another embodiment, if the number of accumulated player tracking points, determined via a player tracking system, is not enough for the player to win a loyalty award, server 208 may enable the player to purchase a suitable amount of player tracking points to enable the player to play a secondary game in an attempt to win a loyalty award. In further embodiment, the triggering event may be random.

Server 208 utilizes player transaction history, player tracking information, and tracked wagering activity to determine when to initiate a triggering event to provide an opportunity to win loyalty awards and to which player to provide such an opportunity. In one such embodiment, for each player playing a primary game on gaming device 10 in gaming system 200, server 208 determines whether to provide player a chance to win a loyalty award by establishing one or more triggering events, wherein each determination is based, at least in part, on that player's transaction history, tracking status, and/or the player's wagering activity. In this embodiment, after the player satisfies a triggering event, such as a player of a defined player tracking status placing a defined amount of wagers, server 208 provides the player with an opportunity to win a loyalty award via a secondary game. In one embodiment, players with different player tracking statuses must wager different amounts to be eligible to win loyalty awards. For example, a bronze level player must wager a first amount to win a loyalty award and a gold level player must wager a second, different amount to win a loyalty award. In another embodiment, players with different player tracking status who wager the same amount are provided different levels of loyalty awards to win in a secondary game. In a further embodiment, an amount a player must wager to win a loyalty award depends on the type of loyalty award offered to win.

In one embodiment, server 208 utilizes player tracking information associated with a plurality of players and selects one player to provide a chance to win loyalty award in a secondary game. The probability of server 208 selecting a player is based on that player's player tracking or player loyalty information. For example, server 208 might rate the players as follows: 1) Player A with a player tracking card with a long history of higher dollar bets, 2) Player B with a player tracking card with a long history of average bets, 3) Player C with no player tracking card currently wagering high dollar amounts on a gaming machine for a specified period of time, 4) Player D with a player tracking card with a history of low bets, 5) Player E with no player tracking card currently wagering average bets and 6) Player F with no player tracking card currently wagering low bets. In this example, Player A would be more likely to receive a chance to win a loyalty award than Player F. However, in this example, each player is still eligible to receive a chance to win one of the loyalty awards. It should be appreciated that just because the player tracking system does not maintain information about a player (i.e., the player does not have a tracking card), the player could still obtain a higher likelihood of receiving one of the loyalty awards by wagering higher dollar amounts. In one such embodiment, after providing an uncarded player with a chance to win a loyalty award, gaming system 200 prompts the player to join the player tracking club to enable server 208 to access the player's transaction history and thereafter to offer a chance to win a loyalty award in a secondary game.

In another embodiment, a determination of which player (s), if any, to provide a chance to win a loyalty award in a secondary game is based on the player's status, determined via a player tracking system. For example, a bronze player may have a 0.5% chance of winning a loyalty award, a silver player may have a 1.0% chance of winning a loyalty award, a gold player may have a 1.5% chance of winning a loyalty award, and a platinum player may have a 2.0% chance of winning a loyalty award. Accordingly, it should be appreciated that server 208 is adapted to target specific players or groups of players based on each player's gaming activity, such as each player's amount wagered, time played, games won, or player tracking status.

It should be appreciated that by utilizing such a player tracking system, server 208 does not provide a loyalty award to an empty or uncarded gaming device 10. In such an embodiment, a card-in event starts the tracking of a player's gaming activity for loyalty award determinations. Thus, the carding of the player ensures the person who actually "wins" the loyalty award is provided with the loyalty award because such a loyalty award is associated with the player tracking card and not gaming device 10. In another embodiment, the tracking of gaming activity for loyalty award determinations starts when gaming device 10 is activated. In this instance, server 208 recognizes that gaming device 10 is being wagered on and keeps track of these wagers. If gaming device 10 is chosen to initiate a secondary game and a loyalty award won, server 208 provides that loyalty award to gaming device 10 (and not necessarily to the player who may have been responsible for the gaming activity recorded from gaming device 10).

In another embodiment, in determining whether to provide a player chance to win loyalty award via a secondary game, server 208 determines if enough "coin-in" has been collected by gaming system 200 to provide a loyalty award. That is, in one embodiment, a loyalty award coin-in pool must be sufficiently funded or funded to a predetermined level to enable server 208 to provide one or more loyalty awards. In one such embodiment, server 208 utilizes an average expected payout associated with a loyalty award to determine if the coin-in pool is sufficiently funded. In one embodiment, after determination by server 208 that the coin-in pool is sufficiently funded to provide one or more loyalty awards, server 208 initiates a secondary game. In another embodiment, as opposed to automatically initiating a secondary game, after the coin-in pool is sufficiently funded, server 208 randomly determines whether to initiate a secondary game. In one such embodiment, after enough coin-in has been collected, server 208 determines, at designated intervals, whether to initiate a secondary game. In different embodiments, the designated intervals are based on monetary units wagered or based on time elapsed.

Server 208 may utilize a true time based model to determine whether to provide a player a chance to win a loyalty award in a secondary game. In such an embodiment, loyalty awards are funded by a pool that is built up and subsequently depleted as each loyalty award is provided to a player. As described below, in such an embodiment, server 208 initiates one or more secondary games to last for a designated amount of game plays or time, or alternatively, until the pool is depleted.

In another embodiment, server 208 utilizes predictive modeling to determine whether to provide a player a chance to win a loyalty award in a secondary game. Server 208 accounts for the number of gaming devices 10 that are being actively played, the wager amounts, or the bets being made at each gaming device 10, and how much is expected to be provided at each actively played gaming device 10. Server 208 uses this information to determine when to provide a player a chance to win loyalty award. In one embodiment, active status means that gaming device 10 is being actively played by a player and enrolled/inactive status means that gaming device 10 is not being actively played by a player. The active status requirements can be based on any suitable number of satisfied criteria or defined in any suitable manner by the implementer of gaming system 200. For example, a play of, or wager on, the primary game of gaming device 10 within a predetermined period of time may be part of the determination of whether gaming device 10 is in the active status. Other factors such as: (a) the amount of time between each play of or wager on the primary game of gaming device 10; (b) the amount being wagered on the primary game(s); (c) the number of plays within a period of time, and (d) the existence of credits on gaming device 10 may also or alternatively be part of the determination of whether gaming device 10 is in the active status. On the other hand, inactive status means that gaming device 10 is one of the gaming machines in gaming system 200, but is not in the active status (i.e., not being actively played by a player according to one or more of the predetermined criteria).

In different embodiments, server 208's determination to provide at least one of the players an opportunity to win a loyalty award via a secondary game is predetermined, determined based on one or more game play events, such as a symbol-driven trigger, determined based on a random determination by server 208, determined based on a random determination at one of gaming devices 10, determined based on one or more side wagers placed, determined based on a player's primary game wager, or determined based on any other suitable method or criteria. In different embodiments, server 208 provides a chance to win a loyalty award if one or more players exceed a certain amount of game play (such as number of games, number of credits, or amount of time), or reaching a specified number of points earned during game play.

After processor 12 provides server 208 with an indication that the secondary game is initiated, server 208 determines at least one of a plurality of different loyalty awards to include as possible loyalty awards associated with the secondary game based on player tracking information and the transaction history of the player. Once server 208 has determined at least one of a plurality of different loyalty awards to include as possible loyalty awards associated with the secondary game, processer 12 is programmed to present the player with at least one of a plurality of different loyalty awards. In one embodiment, more than one loyalty award may be presented to the player, and thus, processer 12 is programmed to enable the player to select at least one of a plurality of different loyalty awards associated with the secondary game or decline a selection of the loyalty awards if the player chooses not to play the secondary game at this time (as discussed in further detail below). In a further embodiment, the player may choose a plurality of loyalty awards to win. However, as the value of a loyalty award increases, or as the player chooses to win more loyalty awards, the odds of winning those awards decreases. For example, once a player selects one or more loyalty awards to win, server 208 will determine the odds of issuing loyalty awards based on at least one of a value of a selected loyalty award and/or a wager amount associated with the secondary game. Thereafter, processer 12 alters the odds of issuing the loyalty award based on the item selected for removal. In a further embodiment, the player may not have an opportunity to select which loyalty award the player would like to win. In such an embodiment, server 208 automatically applies a loyalty award to the secondary game.

Processer 12 may be programmed to request a secondary wager that is separate from a primary wager received to initiate play of the primary game. The secondary wager may be requested to continue initiation of the secondary game or to increase the odds of winning the loyalty award offered in the secondary game, as discussed in further detail below. The secondary wager may be removed from credits the player has accumulated in the primary game, or the secondary wager may be placed into gaming device 10, for example, via a payment acceptor (e.g., the payment acceptor 24). After the secondary wager is accepted, play of the secondary game is initiated and an outcome of the secondary game is determined Processor 12 is programmed to provide server 208 with the outcome of the secondary game and server 208 updates the player's transaction history accordingly. For example, if the player won a dinner in the secondary game, server 208 updates the player's transaction history to indicate that the player will now not be billed for the dinner.

It should be appreciated that one, more or each of the functions of server 208 as disclosed herein may be performed by one or more processors 12. It should also be appreciated that one, more or each of the functions of one or more processors 12 as disclosed herein may be performed by server 208.

With reference now to FIG. 3, a flow diagram of an exemplary method 300 for utilizing a player's transaction history within a gaming establishment to determine loyalty awards in a secondary game is illustrated. Once a player funds gaming device 10 (shown in FIG. 1) to initiate a primary game, at 302, game play data for the player playing the primary game is received, for example, by a processor such as processor 12 (shown in FIG. 2). Notably, a player tracking system (not shown) tracks the player's transaction history and enables gaming device 10 to display this information to a player. For example, during game play, gaming device 10 displays, either persistently or based on a player command, a current number of points earned by the player, an in-game currency value that represents a number of credits purchased by the player through cash or some other medium, a side game currency value that represents wager amounts made on other games or a number of credits available for such wagers, and/or a digital score for use in obtaining virtual and/or physical awards for use during game play. Furthermore, in some embodiments, gaming device 10 displays, either persistently or based on a player command, a leader board that shows where the player ranks with other players in terms of points earned or a digital score.

In the exemplary embodiment, the player may play the primary game as normal until a triggering even occurs during the play of the primary game. At 304, after initiation of a triggering event, a secondary game that provides the player an opportunity to win a loyalty award is initiated. As described above, a triggering event may be, but is not limited to being, one or more of the following: a point accumulation, a length of time, and a level in the primary game. The initiation of the secondary game may take the form of a question, such as, "Would you like an opportunity to erase last night's dinner from your bill for two credits?" or "would you like an opportunity to remove one of the following items from your bill?" In one embodiment, the player is presented with a plurality of loyalty awards and the player has an option to select one or more of the presented loyalty awards to win. In a further embodiment, one or more loyalty awards are automatically selected by, for example, server 208 (shown in FIG. 3). In one embodiment, once an offer to play the secondary game is made, a player has an opportunity to accept or decline the offer. If the player declines the offer, the primary game proceeds. If the player accepts the offer, the player is provided with more details regarding the secondary game, for example, what condition must be met to win the loyalty award.

A secondary wager, separate from the primary wager received, may be required to play the secondary game. The secondary wager may be requested to continue initiation of the secondary game or to increase the odds of winning the loyalty award offered in the secondary game. In one embodiment, the secondary wager may be removed from credits the player has accumulated in the primary game, or the secondary wager may be placed into gaming device 10, for example, via a payment acceptor, e.g., payment acceptor 24 (shown in FIG. 1). After the secondary wager is accepted, play of the secondary game is initiated and, an outcome of the secondary game is determined 308 and any loyalty awards won are issued 310 to the player. For example, if the player won a payment for last nights dinner as a loyalty award in the secondary game, the loyalty award is issued to the player by updating the player's transaction history to indicate that the player will not be billed for that dinner.

In some embodiments, server 208 determines an amount or value to provide to the player as the loyalty award. For example, if server 208 determines to provide a player with a chance to win loyalty award with a value of $10.00, server 208 selects items in a player's transaction history that equal, or that are close to the charge of $10.00. In one embodiment, server 208 may combine two $5.00 loyalty awards to equal the determined $10.00 value. In some embodiments, the value of the loyalty award is based on the player's status (such as determined through a player tracking system). In one such embodiment, server 208 determines different amounts or values to provide as loyalty awards to different players of different player status levels who are wagering the same amount. For example, server 208 determines a first amount or value to provide to a first player, of a first player status level, wagering a first amount and a second, higher amount or value to provide to a second player, of a second, greater player status level also wagering the first amount. In different embodiments, the value for the loyalty award is predetermined, randomly determined, determined based on a generated symbol or symbol combination, determined based on a random determination by server 208, determined based on a random determination at gaming device 10, determined based on one or more side wagers placed, determined based on the player's primary game wager, determined based on time (such as the time of day), determined based on an amount of coin-in accumulated in one or more pools or determined based on any other suitable method or criteria.

In one embodiment, the loyalty award is funded, at least in part, via an amount provided by one or more marketing and/or advertising departments, such as a gaming establishment's marketing department. Such funding provides that the loyalty awards do not decrease the gaming payouts of any gaming devices 10. In another embodiment, the loyalty award is funded, at least in part, via one or more loyalty award pools of coin-in. In this embodiment, as described above, server 208 allocates a certain percentage of each wager placed to a loyalty award pool, wherein the loyalty award is funded from the wagers or coins-in allocated to the loyalty award pool. In another embodiment, the loyalty award is funded, at least in part, via one or more funds set up for such loyalty awards.

After determining an amount or value to provide to the player as the loyalty award, server 208 determines an appropriate loyalty award issuing probability to communicate to the player's gaming device. As described in more detail below, the determined attributes, parameters or characteristics of the loyalty award issuing probability are based on the determined amount or value to provide to the player as the loyalty award, the attributes, parameters or characteristics of the player's wagering activity and the attributes, parameters or characteristics associated with the player's currently played gaming device. In one embodiment, in addition to these considerations when determining the loyalty award issuing probability specific to the player's currently played gaming device, server 208 and gaming device communicate information regarding various aspects of the determined loyalty award.

In one embodiment, in determining the loyalty award issuing probability, the player's currently played gaming device communicates information or data to server 208 regarding that gaming device, and server 208 determines the appropriate loyalty award issuing probability based on this communicated information or data. In another embodiment, when server 208 communicates or downloads information or data relating to the currently played game program to gaming device 10, server 208 logs in and/or stores the appropriate information. In such an embodiment, when determining the loyalty award issuing probability, server 208 accesses this logged in and/or stored information to determine the appropriate loyalty award issuing probability for the player's currently played gaming device 10. In another embodiment, server 208 periodically monitors which games are being played on one or more gaming device 10 and stores information or data resulting from these checks. As such, when determining the loyalty award issuing probability, server 208 accesses this stored information or data to determine the appropriate loyalty award issuing probability for the player's currently played gaming device 10.

It should be appreciated that since the player may be playing at any of a number of gaming devices and thus utilizing any paytable of any gaming device 10 in gaming system 200, in determining an appropriate loyalty award issuing probability to communicate to the player's gaming device 10, server 208 accounts for the average expected payout or value of each game played utilizing the paytable associated with the player's currently played gaming device 10. That is, in determining a loyalty award issuing probability specific to the parameters of gaming device 10 the player is currently playing, enables server 208 to provide the player with an opportunity to win a loyalty award, regardless of which gaming device 10 the player is playing. For example, if a player is playing a first gaming device, gaming system 200 determines and utilizes a first loyalty award issuing probability that is specific to the first gaming device to provide the player a chance to win a loyalty award. In this example, if the player moves to a second gaming device in communication with server 208, gaming system 200 determines and utilizes a different, second loyalty award issuing probability specific with the second gaming device to provide the player with a chance to win the same loyalty award. In another example, if a player is playing a game at a first wager amount, and thus utilizing a first paytable, on gaming device 10, gaming system 200 determines and utilizes a first loyalty award issuing probability specific to the game played based on the first wager amount. In this example, if the player switches to playing a game with a second wager amount, and thus utilizes a second paytable, on the same gaming device 10 or data different gaming device 10, gaming system 200 determines and utilizes a second loyalty award issuing probability that is specific to the game played at the second wager amount to provide the player a loyalty award.

In determining gaming device 10's paytable (or overall payback percentage), the base or primary game payback percentage may be separate from the bonus or secondary game payback percentage. In one such embodiment, in determining the loyalty award issuing probability for a determined amount to be provided as the loyalty award, server 208 accounts for the base game payback percentage (and not the bonus game payback percentage). In another such embodiment, in determining the loyalty award issuing probability for a determined amount to be provided as the loyalty award, central 208 server accounts for both the base game payback percentage and the bonus game payback percentage.

It should be appreciated that differing from promotional credits, the determined loyalty award issuing probability is instantaneously provided to a player. That is, the moment the player qualifies for a secondary game, an appropriate loyalty award issuing probability is downloaded from server 208 and is then playable on the player's currently played gaming device. Such a configuration provides that if it is determined to provide a player a chance to win a loyalty award, server 208 determines an appropriate loyalty award issuing probability to immediately provide a chance to win a loyalty award in a secondary game, via any gaming device in communication with server 208 that the player is playing. Such a configuration enables immediate access to a loyalty award utilizing gaming device 10 the player is currently playing and does not require the player to return to the gaming establishment at another time to obtain their loyalty award.

After determining a value of the loyalty award and the appropriate loyalty award issuing probability, server 208 communicates a loyalty award issuing probability message to the player's currently played gaming device. In one such embodiment, the message includes information or data regarding the determined loyalty award issuing probability. In another such embodiment, the message includes information or data regarding a value or amount to be provided as the loyalty award and the determined loyalty award issuing probability to be utilized to provide such a value or amount to the player. In another embodiment, the message includes instructions that cause gaming device 10 to execute the determined loyalty award issuing probability, which may be stored locally by gaming device 10. In an alternative embodiment, server 208 decides to hold the chance to win a loyalty award until a later time for any number of reasons, such as: the player does not have enough funds to use it, the player is cashing out, or the gaming establishment is currently at a "busy" time and no incentive is needed to influence the player to continue playing.

A message controller or message module associated with server 208 may transmit one or more messages to be displayed on the player's gaming device 10 to inform the player that a secondary game is being offered and what loyalty awards the secondary game entails. In one embodiment, the messaging is positioned and/or timed to not interfere with the current primary game played. In another embodiment, the gaming establishment operator is enabled, via the message controller, to configure the presentation, look, and "feel" of the messages displayed to the player. In one embodiment, gaming device 10 forms or opens a window on the main game display to provide information regarding the secondary game. In a further embodiment, the message regarding the secondary game is provided by processor 12 or is remotely provided by server 208.

In one embodiment, once the secondary game is set to begin, gaming device 10 does not enable player initiated changes in denomination, coins bet per line, or lines played until completion of the secondary game. In this embodiment, since server 208 determines the loyalty award issuing probability based on certain gaming parameters specific to the player's game play at the player's currently played gaming device, any player initiated changes to these parameters will alter the previously determined loyalty award issuing probability. For example, if server 208 determines a removal of a previously purchased dinner with a value of $50.00 to be provided as the loyalty award and further determined a loyalty award issuing probability of a player playing ten games with an average expected payout of $5.00 per game played, and prior to initiating the secondary game, the player switched to a game with a $9.50 average expected payout per game played, then the ten games of the secondary game would theoretically provide the player a value of $95.00 for the loyalty award. For this reason, once the loyalty award issuing probability is set to begin, gaming device 10 does not enable player initiated changes in denomination, coins bet per line, or lines played until completion of the secondary game. Such a configuration encourages players to wager consistently so that when server 208 determines to provide that player a chance to win a loyalty award, the gaming parameters of the loyalty award issuing probability are the same or substantially the same as the gaming parameters which the player was previously playing.

Gaming system 200 described herein determines and provides the loyalty award issuing probability based on a maximum wager. In this embodiment, even if the player is not currently playing a primary game at the maximum wager amount, gaming system 200 determines and provides the loyalty award issuing probability at the maximum wager amount. That is, the secondary game includes an upgrade of the player's current wager amount to the maximum wager amount for one or more plays, of one or more games, of the secondary game.

Gaming system 200 disclosed herein also enables a player to change one or more aspects of their gaming activity. In this embodiment, as the player changes one or more aspects of their gaming activity, such as changes in denomination, coins bet per line, or lines played until completion, gaming device 10 and/or server 208 dynamically changes the loyalty award issuing probability such that the player is still provided a chance to win the same or substantially the same loyalty award. In one such embodiment, the player is enabled to change one or more aspects of their gaming activity, gaming device 10/server 208 reconfigures the loyalty award issuing probability and the player is enabled to accept or reject the reconfigured loyalty award issuing probability. In this embodiment, if the player accepts the reconfigured loyalty award issuing probability, the reconfigured loyalty award issuing probability proceeds with the changed aspects of gaming activity.

After an outcome of a secondary game is determined, and a loyalty award is issued to a player based on the outcome, gaming device 10 communicates a secondary game completion message to server 208, wherein the completion message includes information regarding the loyalty award actually issued or not issued to the player in the secondary game. Upon communicating the secondary game completion message to server 208, gaming device 10 ends the secondary game and enables the player to return to normal game play mode in a primary game.

In another embodiment, server 208 provides the determined award information to gaming device 10, and gaming device 10 determines the appropriate loyalty award issuing probability. In this embodiment, server 208 communicates information or data to gaming device 10, wherein the information or data relates to the determined value to be provided as the loyalty award. Upon receiving such communicated information or data, gaming device 10 determines the appropriate loyalty award issuing probability to provide the determined value for the loyalty award to a player.

Gaming system 200/gaming device 10 enables the player to accept or reject a secondary game. That is, gaming system 200/gaming device 10 enables the player to choose whether or not to play the secondary game at the time it is offered. In one embodiment, if the player rejects the offered secondary game, then the player will lose, e.g., be unable to later play, the ability to play the particular secondary game being offered. In another embodiment, if the player rejects the offered secondary game, player data and the player's loyalty awards associated with the secondary game being offered are stored or escrowed for use at a later time. In this embodiment, the stored data includes, but is not limited to, the player's name, the player's ID, the date/time of earning the secondary game, any expiration of the stored secondary game, any applicable multiplier, the determined amount to provide to the player as a loyalty award, the applicable denomination of the secondary game, any applicable wager amount, any applicable maximum wager amount and/or any other suitable criteria.

In various embodiments which utilize storing a secondary game, server 208 continuously, or at regular intervals, reevaluates the player's gaming activity to determine if predetermined conditions exists to offer the player an ability to play the stored secondary game. Moreover, when server 208 determines that such conditions exist, server 208 prompts gaming device 10 to provide the stored secondary game. If gaming device 10 rejects server 208's request to provide the stored secondary game (e.g., gaming device 10 determines that the condition is not right to provide the secondary game), server 208 continues to store the rejected secondary game for any subsequent reattempts. If gaming device 10 accepts the stored secondary game (e.g., gaming device 10 concurs that the conditions are correct to provide the stored secondary game), gaming device 10 presents the stored secondary game to the player. In one such embodiment, gaming device 10 enables the player to reject (e.g., decline to initiate) a previously stored secondary game, wherein the rejected secondary game is stored for any subsequent reattempts. In these embodiments, the conditions for providing a stored secondary game include, but are not limited to, the player's transactional history, the date and time, the amount of coin-in, the jackpot level, the player playing the same type of game they won a chance to play the secondary game on, is the player wagering within a suitable range of wager amounts, and/or any other suitable criteria.

A player may select not to play their stored secondary game once the stored secondary game is offered. Gaming system 200/gaming device 10 described herein enables the player to choose when to use the stored secondary game. In this embodiment, the player initiates a request to play a stored secondary game at the player's currently played gaming device 10, such as via gaming device 10's screen or via a player tracking panel. In one such embodiment, the player is required to enter an identifying device and/or to enter a suitable security code, such as a PIN number. After receiving the request to use the stored secondary game, server 208 determines, as described above, if the conditions are correct to provide the stored secondary game. As described above, if the conditions are not correct, e.g., the secondary game is rejected by gaming device 10, the rejected secondary game is stored by server 208. In these embodiments, such conditions include, but are not limited to, the player's transactional history, does the player have sufficient credits on the credit meter, the player wagering a suitable amount, the player playing a suitable game, has the player wagered a suitable amount of coin-in, the jackpot level, the player a suitable ranking, has the player earned a suitable amount of player tracking points and/or any other suitable criteria.

In another embodiment, gaming system 200 enables the player to simultaneously escrow or store multiple secondary games. In such an embodiment, gaming system 200 enables the player to combine two or more chances to win a loyalty award into one secondary game. In this embodiment, when combining two or more chances to win a loyalty award, server 208 adds the amount associated with each of the loyalty awards together. In different embodiments, server 208 determines a secondary game to provide to the player based on the combined amounts, gaming device 10 currently played, any applicable wager amount, the wager amount currently played, the player's rank and/or any other suitable characteristic. For example, for a designated player, gaming system 200 simultaneously stores a first loyalty award associated with a first secondary game with a value of $20 and a second stored loyalty award associated with a second secondary game with a value of $10. In this example, server 208 is operable to combine the first and second stored loyalty awards and offer the player a chance to win a new loyalty award based on a value of $30.

Stored loyalty award issuing probabilities may be associated with a time period for usage. Such loyalty award issuing probabilities may be associated with a time of day, certain day(s) of week, a month and/or a year which they can be used. In one embodiment, server 208 excludes the player from playing a loyalty award issuing probability during certain days and times. For example, a player's previously stored loyalty award issuing probability with respect to a loyalty award may be available for play each day in July from 8:00 am to 5:00 pm.

In another embodiment, secondary games are associated with an expiration date and time. In this embodiment, gaming system 200/gaming device 10 is configured to communicate to the player the proximity of the expiration of any stored secondary games, i.e., "your secondary game will expire at 6:00 am tomorrow". In one embodiment, the notice of expiration of a stored secondary game is at the player's currently played gaming device 10. In another embodiment, such notice of expiration of a stored secondary game is external from the player's currently played gaming device 10, such as via e-mail.

One or more stored secondary games may expire after a designated number of games have been played, after a designated period of time, or upon completion of a player's current gaming session. In another embodiment, if multiple secondary games are stored in associated with a player's account, gaming system 200 limits or caps the number of secondary games that may be stored at any one time. If multiple secondary games are stored in or associated with a player's account, the presentation of stored secondary games are provided to the player in order of expiration (first to expire shows first), in order of first earned basis, in order of being associated with the greatest value amount or in order of being associated with the least value amount. In another embodiment, the amount associated with a stored secondary game is dynamic and changes based on current gaming status. For example, if it is a busy time, the amount of a loyalty award available to win in a stored secondary game may be worth less, if it is a slow time, the amount may be worth more. In one embodiment, gaming system 200 provides the player notice of the implications of using a stored secondary game at different times.

In one embodiment, server 208 determines to provide the player a loyalty award utilizing extra plays, for example, extra spins, as a loyalty award in a secondary game. Gaming device 10 is commanded by server 208 to provide a certain quantity of extra spins. In this embodiment, in determining the number of extra spins to include, server 208 accounts for the average expected payout or average expected value of each free spin (which is based on the game being played and its associated paytable) and equate this value to the value or amount determined to be provided to the player as a loyalty award. This determination requires analysis of a bet placed, the paytable utilized, and the value or amount previously determined by server 208 to be provided as the loyalty award. That is, a defined relationship exists between the determined number of free spins and the determined value or amount to provide to the player as a loyalty award.

For example, if server 208 determines a value of $19.00 to be awarded to the player as a value of a loyalty award and the player is currently playing a first game that has an overall payout percentage of 95.00% (i.e., the average expected payout for each spin is $0.95 for every $1.00 wagered), server 208 provides the player an extra twenty spins in the secondary game. That is, the twenty extra spins with an average expected payout of $0.95 per spin equals a total expected value of $19.00 for the extra spins (which is equal to the value of $19.00 previously determined to be provided to the player as the value of the loyalty award). In another embodiment, rather than utilizing twenty extra spins to provide the player a chance to win a loyalty award, server 208 provides a player with ten extra spins wherein any award is modified by a multiplier of 2× (or 5 extra spins wherein any award is modified by a multiplier of 4×) in an attempt to provide the player a loyalty award with a value of $19.00. In another example, rather than utilizing a set number of extra spins with a designated number of activated paylines to provide the player a chance to win a loyalty award, server 208 modifies the number of activated paylines and thus modifies the number of extra spins in the secondary game. For example, rather than utilizing twenty extra spins, wherein 4 paylines are activated per extra spin, server 208 provides an extra spin in a secondary game of ten extra spins wherein eight paylines are activated per extra spin (or forty extra spins wherein two paylines are activated per extra spin) to attempt to provide the player a loyalty award with a value of $19.00.

In another embodiment, if an extra spin loyalty award is triggered, server 208 utilizes a fixed number of extra spins and determines an applicable multiplier to apply to each of the extra spins. In this embodiment, server 208 determines, based on the average expected payout of each extra spin and server 208 determined value to provide to the player as the loyalty award, a multiplier to apply to one or more of the fixed number of extra spins. In embodiments, the fixed number of extra spins provided is predetermined, randomly determined, determined based on a generated symbol or symbol combination, determined based on a random determination by the central controller, determined based on a random determination at gaming device 10, determined based on one or more side wagers placed, determined based on the player's primary game wager, determined based on time (such as the time of day), determined based on the amount of coin-in accumulated in one or more pools, or determined based on any other suitable method or criteria.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gaming device comprising:

an interface unit configured to accept game play data from a player; and a controller coupled to the interface unit, the controller comprising a processor and a memory, wherein the memory stores player tracking data associated with the game play data, the player tracking data including a player transaction history including at least one of: (a) at least one item previously purchased by the player in association with a gaming establishment, and (b) at least one service previously purchased by the player in association with the gaming establishment, and wherein the processor is configured to:

receive, via the interface unit, game play data for the player playing a primary game;

initiate a play of a secondary game in response to detection of a triggering event;

enable the player to select at least one of a plurality of different loyalty awards associated with the secondary game, wherein each of the loyalty awards is based at least in part on the player tracking data and has a value associated with at least one of: (a) the at least one item previously purchased by the player, and (b) the at least one service previously purchased by the player;

determine an outcome of the secondary game; and provide the selected at least one loyalty award to the player if the determined outcome of the secondary game is a designated outcome.

2. The gaming device in accordance with claim 1, wherein the provided at least one loyalty award includes removal of at least one of: (a) the at least one item previously purchased by the player, and (b) the at least one service previously purchased by the player from the transaction history of the player.

3. The gaming device in accordance with claim 2, wherein the processor is further configured to alter odds of providing the selected at least one loyalty award based on the value of said selected at least one loyalty award.

4. The gaming device in accordance with claim 1, wherein the processor is further configured to enable the player to decline the initiation of the play of the secondary game.

5. The gaming device in accordance with claim 1, wherein the processor is further configured to:

present the player with the plurality of different loyalty awards associated with the secondary game; and enable the player to decline a selection of any of the loyalty awards.

6. The gaming device in accordance with claim 1, wherein the processor is further configured to request a secondary wager to continue initiation of the play of the secondary game, wherein the secondary wager is separate from a primary wager received to initiate play of the primary game.

7. A system comprising:

at least one server comprising memory configured to store player tracking data, wherein the player tracking data includes a transaction history of a player, the transaction history including at least one of: (a) one or more items previously purchased by the player in association with a gaming establishment, and (b) one or more services previously purchased by the player in association with the gaming establishment; and a plurality of gaming machines communicatively coupled to the at least one server via a gaming network, each gaming machine of the plurality of gaming machines comprising a processor programmed to:

receive game play data for the player playing a primary game;

initiate a play of a secondary game in response to detection of a triggering event during play of the primary game; and provide the at least one server with an indication that the play of the secondary game is initiated, wherein the at least one server, in response to the indication, is configured to:

determine at least one of a plurality of different loyalty awards associated with the secondary game based on the transaction history of the player, wherein each of the loyalty awards has a value associated with one of: (a) at least one of the one or more items previously purchased by the player, and (b) at least one of the one or more services previously purchased by the player;

determine odds of issuing the determined at least one loyalty award based on at least one of the value of the determined at least one loyalty award and a wager amount associated with the secondary game; and update the transaction history of the player based on an outcome of the secondary game.

8. The system in accordance with claim 7, wherein the determined at least one loyalty award includes removal of at least one of: (a) the at least one of the one or more items previously purchased by the player, and (b) the at least one of the one or more services previously purchased by the player from the transaction history of the player.

9. The system in accordance with claim 7, wherein the processor is further programmed to enable the player to decline the initiation of the play of the secondary game.

10. The system in accordance with claim 7, wherein the processor is further programmed to:

present the player with at least one of the plurality of different loyalty awards associated with the secondary game; and enable the player to decline determination of any of the loyalty awards.

11. The system in accordance with claim 7, wherein the processor is further programmed to request a secondary wager to continue initiation of the play of the secondary game, wherein the secondary wager is separate from a primary wager received to initiate play of the primary game.

12. The system in accordance with claim 11, wherein the processor is further programmed to provide at least one of a primary award based on an outcome of the primary game and the determined at least one loyalty award based on the outcome of the secondary game.

13. The system in accordance with claim 7, wherein the triggering event includes one or more of the following:

a point accumulation, a length of time, and a level in the primary game.

14. A computerized method comprising;

receiving by a computer, via an interface unit, game play data for a player playing a primary game;

initiating a secondary game in response to detection of a triggering event during play of the primary game;

determining by the computer at least one of a plurality of loyalty awards associated with the secondary game based on a transaction history of the player, wherein the transaction history includes at least one of: (a) one or more items previously purchased by the player in association with a gaming establishment, and (b) one or more services previously purchased by the player in association with the gaming establishment, and each of the loyalty awards has a value associated with at least one of: (a) the one or more items previously purchased by the player, and (b) the one or more services previously purchased by the player;

determining by the computer an outcome of the secondary game; and providing the determined at least one loyalty award if the determined outcome of the secondary game is a designated outcome.

15. The computerized method in accordance with claim 14, wherein the provided at least one loyalty award includes a removal of at least one of: (a) at least one of the one or more items previously purchased by the player, and (b) at least one of the one or more services previously purchased by the player from the transaction history of the player.

16. The computerized method in accordance with claim 14, further comprising requesting a secondary wager to continue initiation of the secondary game, wherein the secondary wager is separate from a primary wager received to initiate play of the primary game.

17. The computerized method in accordance with claim 14, wherein the triggering event includes one or more of the following: a point accumulation, a length of time, and a level in the primary game.

18. The computerized method in accordance with claim 14, further comprising enabling the player to decline the initiation of the secondary game.

19. The computerized method in accordance with claim 14, further comprising enabling the player to select the at least one of the plurality of loyalty awards associated with the secondary game.

20. A gaming device comprising:

an interface unit configured to accept game play data from a player; and a controller coupled to the interface unit, the controller comprising a processor and a memory, wherein the memory stores player tracking data including a transaction history of the player, the transaction history including at least one of: (a) one or more items previously purchased by the player in association with a gaming establishment, and (b) one or more services previously purchased by the player in association with the gaming establishment and wherein the processor is configured to:

receive, via the interface unit, game play data for the player playing a primary game;

initiate a play of a secondary game in response to detection of a triggering event;

enable the player to select at least one of a plurality of different loyalty awards associated with the secondary game, wherein the selected at least one loyalty award includes removal of at least one entry of (a) at least one of the one or more items previously purchased by the player, and (b) at least one of the one or more services previously purchased by the player from the transaction history of the player;

alter odds of issuing the selected at least one loyalty award based on the at least one entry for removal associated with the selected at least one loyalty award;

determine an outcome of the secondary game; and issue the selected at least one loyalty award based in part on the determined outcome of the secondary game and based in part upon the player tracking data.

* * * * *